Inventor.
John P. Magos.

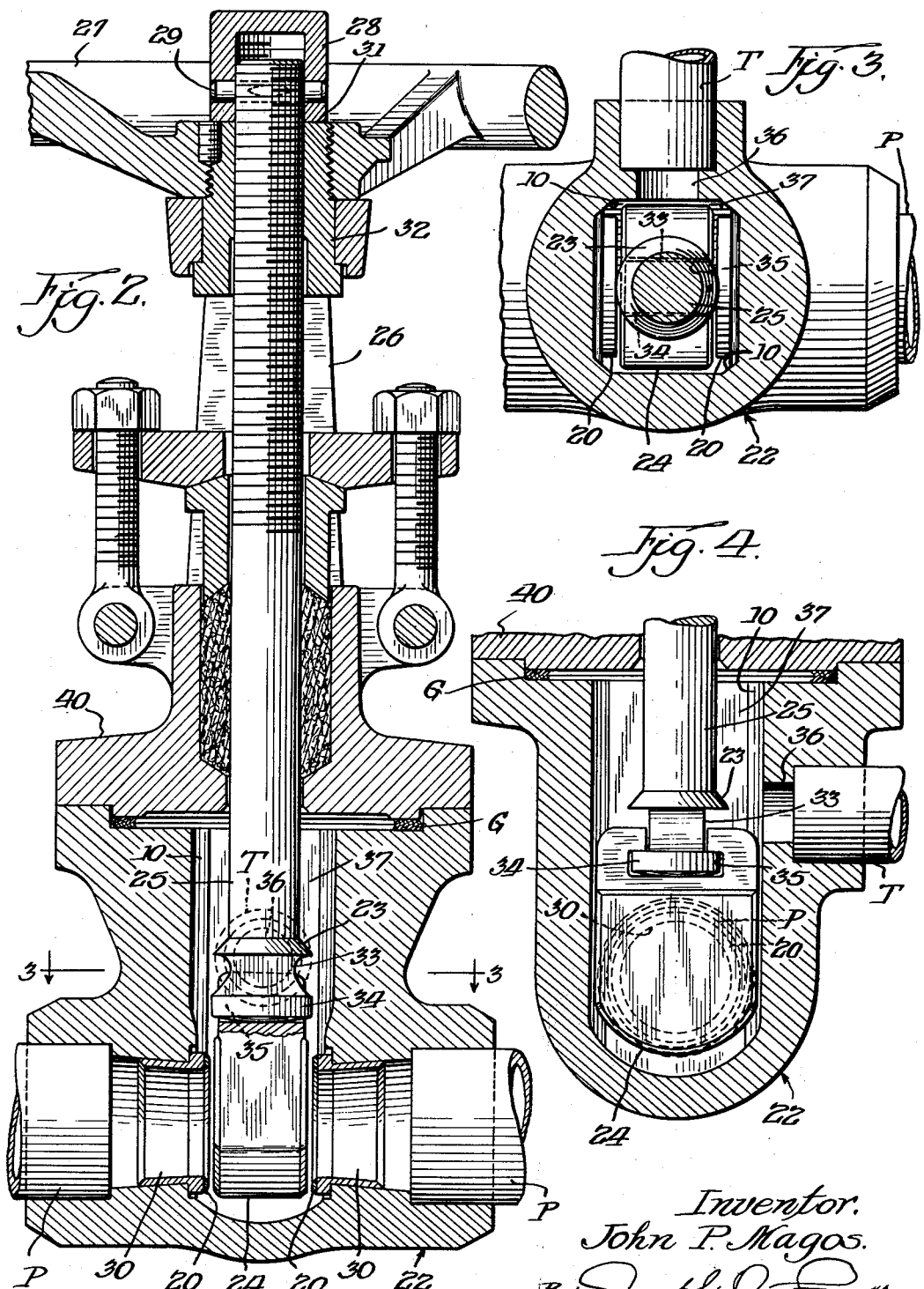

United States Patent Office 3,135,284
Patented June 2, 1964

3,135,284
PRESSURE EQUALIZING MEANS AND
BYPASS VALVE THEREFOR
John P. Magos, Wilmette, Ill., assignor to Crane Co.,
Chicago, Ill., a corporation of Illinois
Filed July 17, 1961, Ser. No. 124,704
1 Claim. (Cl. 137—119)

This invention relates broadly to pressure relief means for use in a valve body or casing and pipe line, and, more particularly, it is directed to a pressure equalizing means and a by-pass valve therefor for preventing the creation of excessive fluid pressures in the body and bonnet of gate valves such as the pressure-sealing type with flexible disc when such gate valve is in closed position and, say, partially filled with water and then is subjected to increased temperature on either one or both seating faces.

In order to acquire an even better appreciation of the background of this invention, it should be understood that particularly where gate valves are employed in a pipe line, it is necessary under certain conditions to relieve excessive pressures in the pipe line when the valve is closed. For example, when a gate valve is closed tightly in the usual manner, line fluid is trapped in the valve casing and in the pipe line between the valve seats. Subsequently, when the valve casing becomes exposed to increases in temperature, the pressure of the trapped fluid is caused to build up within the valve body and bonnet chambers, and, when such fluid pressure becomes sufficiently high, it is not difficult to understand why actual rupture of the valve itself occurs or certain of the internal parts of the valve, such as the body seat rings, will be overstressed, distorted and actually broken in some cases by the direct effect of the trapped fluid exerting very high pressure against such parts under such conditions. It is, therefore, an important object to provide for a relief construction to equalize the fluid pressure in the body and bonnet chambers and overcome automatically such objectionably excessive accumulation of line fluid pressure within the said chambers.

Another object of this invention is to provide a convenient method by which the valve body bonnet or centerpiece chambers are protected by an automatic relief mechanism.

Another object is to provide for a by-pass valve in which the closure member therefor is relatively freely suspended in the valve body thereof to permit such fluid pressure at either of its usual port openings connected to the pipe line to push the said closure member at either of its usual port openings connected to the pipe line to push the said closure member to either one or the other seat face in the valve casing or body.

A further important object of this invention is to provide in cooperation with a main gate valve of the character referred to and the piping means therefor for a novel form of by-pass valve functioning to equalize the fluid pressure in the main valve body and bonnet chambers where heretofore the expansion of such trapped fluids has caused failure of the valve, valve parts or critical portions of the pipe line itself in service.

Another important object is to provide a by-pass gate with a conveniently located side outlet port and indicating means showing when the valve is in the closed position and the closure gate therefore is in the desired position in the casing to be moved in response to fluid pressure to said either one or the other seat face and transversely relative to the stem actuating means of the by-pass gate valve.

Other important objects and advantages of the instant invention will become more readily apparent upon proceeding with the description of this invention in connection with the drawings, in which:

FIG. 2 is a sectional assembly view of the novel by-pass valve per se forming a part of this invention;

FIG. 3 is a transverse sectional view taken on the line 3—3 of FIG. 2; and

FIG. 4 is a fragmentary sectional assembly view taken at right angles to the view of the closure member shown in FIG. 2.

Similar reference numerals refer to similar parts throughout the several views.

Figure 1:
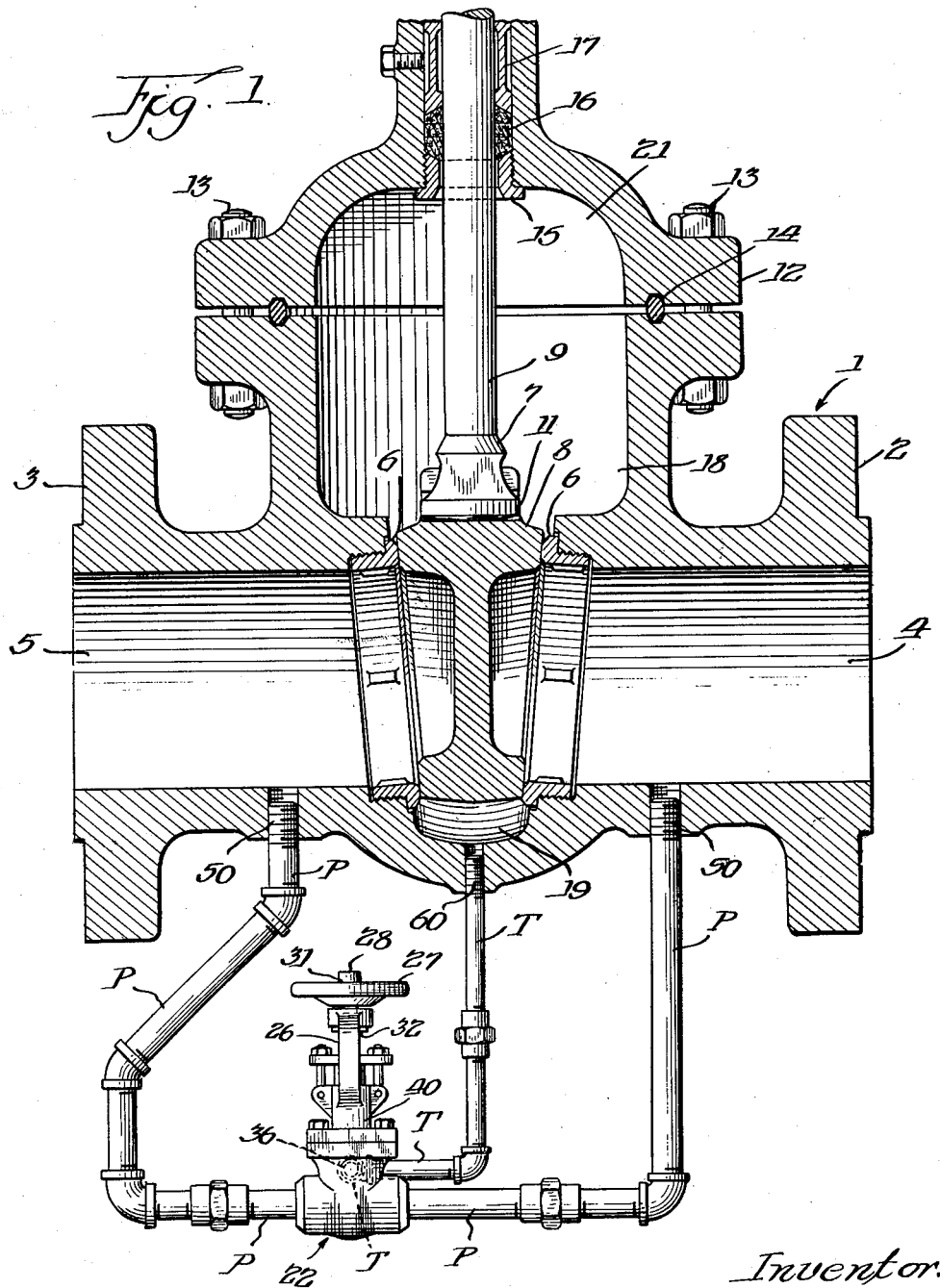
FIG. 1 is a fragmentary sectional assembly view of a valve embodying the by-pass valve and arrangement of piping of this invention.

Referring now to FIG. 1, a main valve generally designated 1 is shown with the usual connecting end flanges at 2 and 3 for effecting the attachment of the main valve to a pipe line (not shown). The valve is provided with the usual inlet passage 4 and outlet passage 5, the inner terminus of the said passages being defined by the respective body seat rings 6, oppositely disposed for seating the main valve closure member 8. The valve is shown in the closed portion, and the main valve closure member 8 is reciprocally movable relative to the said valve seat rings by means of the stem 9 having a T-head connection or any other suitable connection therewith at 11 for the purpose of attachment to the closure member and effecting said reciprocating movement of the latter member. It will be understood that the valve stem is provided with threads (not shown) for the latter purpose, and in the fully open valve position the annular inclined surface 7 contacts the stem hole bushing 15 thus to permit of packing the valve under full line pressure without injury to the operator.

The upper portion of the valve casing 1 is capped by the usual valve bonnet 12 held in sealing relation thereto by means of the bolt studs 13. The said sealed relation to the casing is provided by means of a gasket 14 as shown. At the upper portion of the bonnet 12, the stem hole bushing 15 serves as the journalling means for the stem and also as the base for support of the stuffing box packing 16 and the superposed lantern gland 17. The packing 16 is held under compression by the usual stuffing box gland and bolts (both not shown) to provide fluid sealing between the bonnet 12, bushing 15 and the stem 9. The valve casing is provided with a centrally disposed valve chamber 18, and an annular chamber portion 19 extending around the lower portion of the said seat rings. The combined chambers 18 and 19 are supplemented by the bonnet chamber 21 to provide a single large interconnected chamber. Thus, it will be clear that upon closing the valve, line fluid becomes trapped within the combined chambers 18, 19, and 21. Assuming the valve to be tight, and with the stuffing box 16 and the gasket member 14 also be fluid tight, it should now be easy to understand how a trapped fluid pressure condition is created within the said combined chambers. The ordinary gate valve as hereinabove described has no means for relieving such pressure without opening the valve and if it is assumed that the condensate from a saturated steam has formed, is not drained off, but is exposed to high temperatures, the condensate (water) turns to steam attaining relatively high pressures to cause the damage referred to. Therefore, as stated, a prime purpose of this invention is to provide a means automatically by which fluid pressure accumulating within not only the closure member chamber is easily and positively equalized by means of suitable piping connected thereto combined with a novel by-pass valve forming the subject matter of this invention. This combined construction and its relation to the main valve 1 is now to be described.

Directing attention now to FIG. 2, there is shown as the auxiliary valve of this invention, a by-pass valve generally designated 22. It will be apparent that it is generally of the gate valve type. Yet it differs substantially from the ordinary gate valve in that as indicated at 24 the instant valve is provided with parallel annular seats 20 and with the disc or closure member 24 also of the parallel-faced solid-disc type. However, more importantly, it will be noted that the thickness of the disc or closure member 24 is slightly less than the distance between the oppositely disposed seat faces 20. The valve closure member 24 is actuated in the usual manner by means of a reciprocally movable stem 25 seating in the wide open position with the surface 23 contacting the bonnet 40. The member 24 is attached to the stem in the same manner as described in connection with the main valve of FIG. 1 and to permit relative movement thereon as explained at greater length later. The valve bonnet 40 is sealingly mounted on the body 22 as at gasket G and with side arms 26 has the usual stuffing box therebetween as illustrated and at its upper limit the handwheel 27. At the upper end portion of the stem 25, a special stop cap 28 is attached to the outer end portion of the stem 25 by means of the pin transversely extending at 29 and therefore rides with the stem in the course of the longitudinal movement of the latter member. The purpose of the cap 28 is to provide a combined stop and indicating means to that when it is in the abutting position illustrated and bears against the outer surface 31 of the yoke sleeve 32 it serves to control the inward movement of the stem and closure member and also thereby accurately locates the closure member in desired axial alignment with the respective seat rings 20 and the ports 30 leading thereto.

It should also be understood that the undersize closure member 24 is mounted on the stem 25 as shown more clearly in FIG. 4 by means of a T-head 34 and the reduced or neck portion 33 engaging the suitably slotted relieved portion 35 of the closure member 24 in sliding relation thereto to allow for predetermined transverse movement of the closure member relative to the stem head 34. Thus depending upon direction of fluid flow through the valve ports 30, the valve closure member 24 will be moved transversely slightly on the T-head to contact one or the other of the valve seats 20.

In connection with the novel form of valve disc construction and its functioning relative to the main valve 1, it should now be noted that the by-pass valve 22 is provided with a third port opening at right angles to the normal port openings 30, and as shown more clearly in FIG. 4 at 36, is of smaller size than the said normal openings at P and 30, 30. The said port opening leads into the body neck chamber portion 37 of the valve body 22, of which the corners of the said chamber portion are defined by the vertically disposed surfaces 10. The port 36 has extending therefrom the reduced size tubing T which as shown more clearly in FIG. 1 is threadedly connected by suitable elbow fittings and couplings to the chamber 19 of the main valve 1 as at 60. Of course, it is not critical as to just where the latter connection is made with the said combined chambers of the main valve casing just so that all of the connected body chambers are drained by the tubing T from the connection 60 with the tubing T leading into the chamber 37 of the by-pass valve 22 at the side of the latter valve. The pipe portions P are respectively connected also by means of suitable fittings and couplings threadedly to the respective passages 4 and 5 of the main valve 1 as more clearly set forth in FIG. 1. It will be appreciated that the piping layout illustrated is largely diagrammatic, and may therefore vary substantially to meet actual requirements encountered in the field.

In actual operation, and with the main valve 1 in the closed position as illustrated in FIG. 1, the valve closure 8 makes contact with both seats 6. The fluid pressure in the main piping system upstream as, for example, with the passage 4 will cause the by-pass closure member 24 (FIG. 2) to obturate its downstream seat moving to the left as viewed in FIG. 2. Thus, the increased annular clearance between the disc 24 and the upstream seat provided by such downstream movement of the member 24 will provide continuous and free access through the side port 36 to the body 1 and the respective body and bonnet connected chambers 18, 19, and 21 of the main valve. It should now be apparent that the described arrangement structurally insures continuously uniform equalization of line fluid pressure within the closed main valve and any portion of the main piping system, the latter being connected to the ports 4 and 5 of the main valve. Should the fluid flow be reversed in the main piping system, the same equalizing action above described will occur but in the reverse direction.

It will now be clear that since the by-pass valve stem 25 is provided with the cap nut 28 at the outer end portion protruding through the yoke bushing 32, the by-pass valve closure member 24 is permitted to hang relatively free in the body between the valve seats 20 so as to permit line fluid pressure which may be applied at either of the normal port openings 30, 30 communicating with the system piping at P, P to push the disc 24 transversely relative to the stem 25. This movement is aided by the form and dimensioning of the T-head connection as previously described at numerals 33, 34, and 35, either to seat the closure member 24 on either of the seat rings, depending upon the direction from which the fluid pressure is being applied through either the end connected pipes at P and exerted through either of the communicating ports 30.

It is clear that an effective and easily applied fluid pressure equalizing mechanism has been devised for a main valve permitting normal operation of a by-pass in response thereto and providing a disc gate or closure construction which closes off against the downstream port at all times. The novel design meets all of the usual requirements for a pressure equalizing by-pass valve.

While only a single embodiment has been shown and described in connection with the novel relief means constituting this invention, it will be clear that other means of equalizing fluid pressures in the body and bonnet of the main gate valve may be provided without departing from the spirit of this invention.

I claim:

A gate valve, a casing having an inlet and outlet and a valve chamber therebetween, a gate type closure member reciprocally movable in the valve casing, the casing having spaced-apart parallel valve seats defining end limits of the valve chamber, the thickness of said closure member being substantially less than the space between the contact surfaces of said seats whereby to provide a continuous annular space between the said closure member and said seats, an actuating stem slidably engaging the said closure member at an outer relieved portion thereof to permit movement of the latter member transversely relative to the said seats and said stem substantially along the central axis of the valve inlet and outlet to contact one of said seats in fluid sealing relation in response to fluid flow through the said casing in either one of a plurality of directions, the said casing having a side port opening communicating with said valve chamber.

References Cited in the file of this patent

UNITED STATES PATENTS

| | | |
|---|---|---|
| 1,197,635 | Hunter | Sept. 12, 1916 |
| 2,359,741 | Venton et al. | Oct. 10, 1944 |
| 2,670,752 | Laurent | Mar. 2, 1954 |
| 2,718,233 | Krummel et al. | Sept. 20, 1955 |

FOREIGN PATENTS

| | | |
|---|---|---|
| 447,941 | Great Britain | May 28, 1936 |
| 855,997 | Germany | Nov. 17, 1952 |
| 579,346 | Canada | July 14, 1959 |